(12) United States Patent
Roberts et al.

(10) Patent No.: US 9,172,937 B2
(45) Date of Patent: Oct. 27, 2015

(54) TIMED EVENTS DURING RECORDED MEDIA PLAYBACK

(75) Inventors: Thomas A. Roberts, Fuquay-Varina, NC (US); Oladipupo Olaiya, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 2945 days.

(21) Appl. No.: 11/394,862

(22) Filed: Mar. 31, 2006

(65) Prior Publication Data

US 2007/0237492 A1 Oct. 11, 2007

(51) Int. Cl.
*H04N 9/80* (2006.01)
*H04N 9/87* (2006.01)
*H04N 21/40* (2011.01)

(52) U.S. Cl.
CPC . *H04N 9/87* (2013.01); *H04N 21/40* (2013.01)

(58) Field of Classification Search
CPC ........... H04N 5/00; H04N 9/00; H04N 21/00; H04N 21/2407; H04N 21/40
USPC .............................................. 725/32; 386/46
See application file for complete search history.

(56) References Cited

U.S. PATENT DOCUMENTS

| | | | |
|---|---|---|---|
| 5,329,500 A | 7/1994 | Baik et al. | |
| 5,659,366 A | 8/1997 | Kerman | |
| 6,005,602 A | 12/1999 | Matthews, III | |
| 6,317,882 B1 | 11/2001 | Robbins | |
| 6,522,342 B1 | 2/2003 | Gagnon et al. | |
| 6,993,245 B1 | 1/2006 | Harville | |
| 2003/0007092 A1 | 1/2003 | Sonner et al. | |
| 2003/0142591 A1 | 7/2003 | Baweja et al. | |
| 2004/0158857 A1 | 8/2004 | Finseth | |
| 2004/0172478 A1* | 9/2004 | Jacobs et al. | 709/233 |
| 2005/0144635 A1* | 6/2005 | Boortz | 725/32 |
| 2005/0204382 A1 | 9/2005 | Ellis | |
| 2005/0235319 A1 | 10/2005 | Carpenter et al. | |
| 2005/0251827 A1 | 11/2005 | Ellis et al. | |

(Continued)

FOREIGN PATENT DOCUMENTS

| | | |
|---|---|---|
| EP | 0 980 185 A1 | 2/2000 |
| EP | 1 379 083 A2 | 1/2004 |

(Continued)

OTHER PUBLICATIONS

International Search Report for PCT/US07/64793 mailed Feb. 8, 2008.

(Continued)

*Primary Examiner* — Huy T Nguyen
(74) *Attorney, Agent, or Firm* — Withrow & Terranova, PLLC

(57) ABSTRACT

A system and method are provided for providing a timed event to a user viewing recorded media content at a defined time interval. The recorded media content may be any media viewed on a time-shifted basis. For example, the recorded media may be television content recorded by a Digital Video Recorder (DVR), media content recorded on a Digital Video Disc (DVD), streaming media content providing by a network such as the Internet, or the like. In general, the timed event may be, for example, presenting audio, visual, or audio-visual content and is configured to occur periodically at a time interval such as, but not limited to, every half-hour, every hour, or once a day. Once the timed event is configured, the timed event is periodically effected at the time interval to provide an indication of time while the user is viewing recorded media content.

17 Claims, 6 Drawing Sheets

(56) References Cited

U.S. PATENT DOCUMENTS

2005/0273819 A1    12/2005  Knudson et al.
2006/0104601 A1*   5/2006   Arora et al. .................... 386/46
2010/0107194 A1*   4/2010   McKissick et al. ............ 725/40

FOREIGN PATENT DOCUMENTS

WO    WO01/41430 A1      6/2001
WO    WO 02/086664 A2    10/2002
WO    WO 03/034723 A1    4/2003

OTHER PUBLICATIONS

Summons to Attend Oral Proceedings for European Patent Application No. 07759253.3, issued Jul. 8, 2014, 14 pages.

Reexamination Decision for Chinese Patent Application No. 200780010929.0, issued Nov. 28, 2014, 25 pages (with English translation).

* cited by examiner

TIMED EVENTS DURING RECORDED MEDIA PLAYBACK

FIELD OF THE INVENTION

The present invention relates to presenting timed events, such as audio, visual, or audio-visual events, to a user during playback of recorded media content as an indication of time.

BACKGROUND OF THE INVENTION

Traditional television programming starts on the half-hour or hour. Families have for years relied on this fact to keep track of time. For instance, a family's nightly routine may be based on and around certain viewing milestones. As an example, a family's nightly routine may be "bath time" after Wheel of Fortune and "bed time" after Seinfeld, which may translate to "bath time" at 7:00 p.m. and "bed time" at 9:00 p.m. With time shifted viewing being made possible by Digital Video Recorders (DVRs), program viewing no longer revolves around the half-hour and hour time slots. Recorded programs can start or end at any time and are not necessarily consistent from week to week. Thus, there is a need for a system and method for reminding a user viewing recorded media of the current time.

SUMMARY OF THE INVENTION

The present invention provides a system and method for providing a timed event to a user viewing recorded media content at a defined time interval. The recorded media content may be any media viewed on a time-shifted basis. For example, the recorded media may be television content recorded by a Digital Video Recorder (DVR), media content recorded on a Digital Video Disc (DVD), streaming media content providing by a network such as the Internet, or the like. In general, the timed event may be, for example, presenting audio, visual, or audio-visual content and is configured to occur periodically at a time interval such as, but not limited to, every half-hour, every hour, or once a day. Once the timed event is configured, the timed event is periodically effected at the time interval to provide an indication of time while the user is viewing recorded media content.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a system and method for providing timed events including audio, visual, or audio-visual content to a user viewing recorded media to provide an indication of time. The recorded media may be any media content viewed on a time-shifted basis. For example, the recorded media may be television content recorded by a Digital Video Recorder (DVR), media content recorded on a Digital Video Disc (DVD), streaming media content provided by a network such as the Internet, or the like. In general, a number of timed events are configured to occur at time intervals such as, but not limited to, every half-hour, every hour, or once a day. Once the timed events are configured, the timed events are effected while the user is viewing recorded media content to provide an indication of time.

While the discussion below focuses on preferred embodiments, the present invention is not limited thereto. More specifically, the discussion below focuses on embodiments wherein the present invention is implemented in a set-top box function providing DVR functionality, DVD playback, or the like. However, the present invention is equally applicable to viewing media content of any type on a time-shifted basis. For example, the present invention is equally applicable to a system where time-shifted media content is streamed to user equipment via a network such as the Internet. Likewise, the present invention is equally applicable to a system where media content is streamed to user equipment via a network such as the Internet, recorded on the user equipment, and later viewed on a time-shifted basis. Numerous other variations of the present invention will be apparent to one of ordinary skill in the art upon reading this disclosure.

Figure 1:
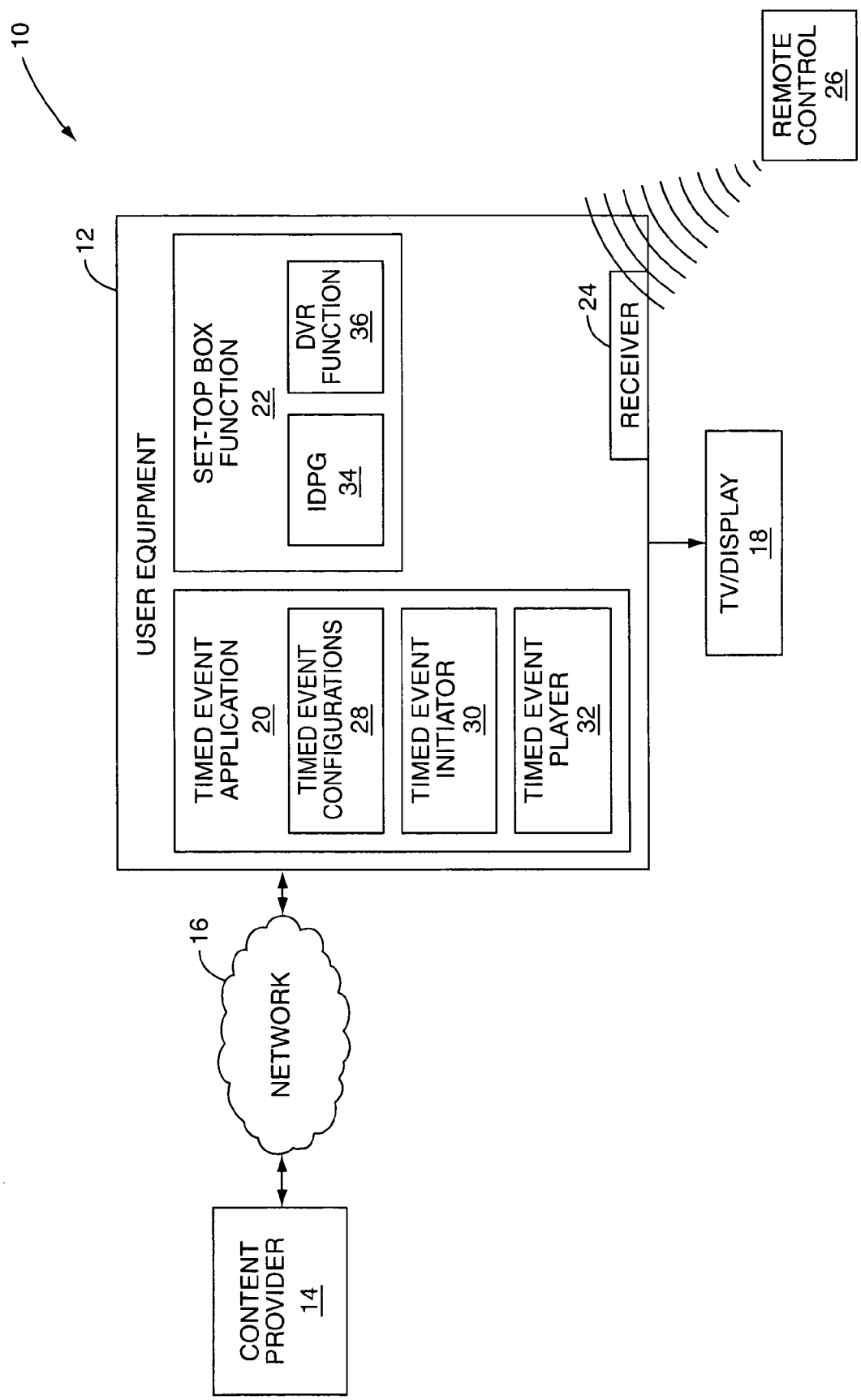
FIG. 1 illustrates a system providing timed events during playback of recorded media content according to one embodiment of the present invention.

FIG. 1 illustrates an exemplary system 10 for providing timed events to a user viewing recorded media content according to one embodiment of the present invention. In general, the system 10 includes user equipment 12 associated with a content provider 14. The user equipment 12 receives media content from the content provider 14 via a network 16 and provides the media content to a television, or display, 18 for presentation to a user. The network 16 may be a land-based network, a satellite-based network, a network providing open-air communication, or the like. In one embodiment, the content provider 14 is a television service provider and the network 16 is a land-based cable network, a satellite based cable network, or the like.

The user equipment 12 may be a set-top box such as, but not limited to, a digital television receiver or a satellite television receiver, either of which may provide Digital Video Recorder (DVR) functionality. Alternatively, the user equipment 12 may be any device or system incorporating set-top box functionality. For example, the user equipment 12 may be a personal computer, television, or the like having a media card providing set-top box functionality. The user equipment 12 includes a timed event application 20, a set-top box function 22, and a receiver 24 for communicating with a user via a remote control unit 26. Further, if the user equipment 12 is a personal computer, the remote control unit 26 may optionally be replaced or augmented by a keyboard, mouse, and the like.

The timed event application 20 may be implemented in hardware, software, or a combination of hardware and software. In addition, although the timed event application 20 is illustrated as being separate from the set-top box function 22, the timed event application 20 may be embedded within the set-top box function 22. For example, both the timed event application 20 and the set-top box function 22 may be implemented on a single media card that may be installed in a set-top box, personal computer, or the like.

The timed event application 20 includes a timed event configurations database 28, a timed event initiator 30, and a timed event player 32. The timed event configurations database 28 may be implemented in memory or other digital storage device such as a hard-drive associated with the timed event application 20. The timed event configurations database 28 stores configurations, or profiles, defining one or more timed events configured by the user. As discussed below in detail, for each timed event, the profile of the timed event includes information identifying audio, visual, or audio-visual content defining the timed event. In addition, the profile of the timed event may include a name, a timed event type, a time interval, a duration, and information identifying whether the recorded media is to be interrupted for the timed event or the timed event is to be presented concurrently with the recorded media content.

The timed event type may be, for example, a background timed event type, an audio timed event type, a visual timed event type, an audio-visual timed event type, or a channel change timed event type. The background timed event type provides timed events using an image as a background and optionally audio content presented concurrently with the background image. The audio timed event type provides timed events using audio content. The audio content may be a song or any other audio clip. For example, the audio content may be the song, or a portion of the song, entitled "Walking on Sunshine" or an audio clip of bells ringing or a buzzer. The visual timed event type provides timed events using images or graphics. The audio-visual timed event type provides timed events using, for example, video clips or segments of videos such a television programming, movies, home movies, or the like. The channel change timed event type provides timed events by changing to a television channel presenting live television content.

The time interval for a timed event may be any time interval such as, but not limited to, every half-hour, every hour, or once a day. Time intervals that are an hour or less are preferably measured based on the hour. More specifically, if the time interval for a timed event is every half-hour, the timed event is preferably initiated on every half-hour. For example, the timed event may be initiated at 1:00 pm, 1:30 pm, 2:00 pm, 2:30 pm, etc. However, the time interval may alternatively be measured from some user defined starting point or from the time of creation of the timed event. If the time interval is an interval greater than an hour but less than a day, the time interval may measured from some user defined starting point or from the time of creation of the timed event. If the time interval is once a day, the timed event may be initiated at a user defined time each day.

The timed event initiator 30 operates to monitor the current time and to initiate the timed events based on the profiles of the timed events, and more specifically the time intervals of the timed events. For example, if a particular timed event has a half-hour time interval, the timed event initiator 30 operates to monitor the current time and initiate the timed event every half-hour. The timed event player 32 operates to present, or effect, the timed events once initiated by the timed event initiator 30. The operation of the timed event player 32 may vary depending on the profiles of the timed events. For example, a particular timed event may be configured such that the recorded media content is to be interrupted to present the timed event. The timed event player 32 may detect a scene change in the recorded media content, pause the recorded media content upon detecting a scene change, present the timed event to the user via the television or display 18 for the duration specified in the profile of the timed event, and then resume playback of the media content.

The timed event type may be, for example, a background timed event type, an audio timed event type, a visual timed event type, an audio-visual timed event type, or a channel change timed event type. The background timed event type provides timed events using an image as a background and optionally audio content presented concurrently with the background image. The audio timed event type provides timed events using audio content. The audio content may be a song or any other audio clip. For example, the audio content may be the song, or a portion of the song, entitled "Walking on Sunshine" or an audio clip of bells ringing or a buzzer. The visual timed event type provides timed events using images or graphics. The audio-visual timed event type provides timed events using, for example, video clips or segments of videos such as television programming, movies, home movies, or the like. The channel change timed event type provides timed events by changing to a television channel presenting live television content.

The set-top box function 22 may be implemented in hardware, software, or a combination of hardware and software. For example, the set-top box function 22 may be a media card including hardware and software components. In operation, the set-top box function 22 provides television content to the television or display 18 in traditional fashion. In addition, the set-top box function 22 may provide an Interactive Digital Program Guide (IDPG) 34 and a Digital Video Recorder (DVR) function 36, the details of which will be apparent to one of ordinary skill in the art upon reading this disclosure. In general, the IDPG 34 may be implemented in software and enables a user to select live television content or television content recorded by the DVR function 36 for playback. The DVR function 36 operates to record television content for later playback by the user.

Figure 2:
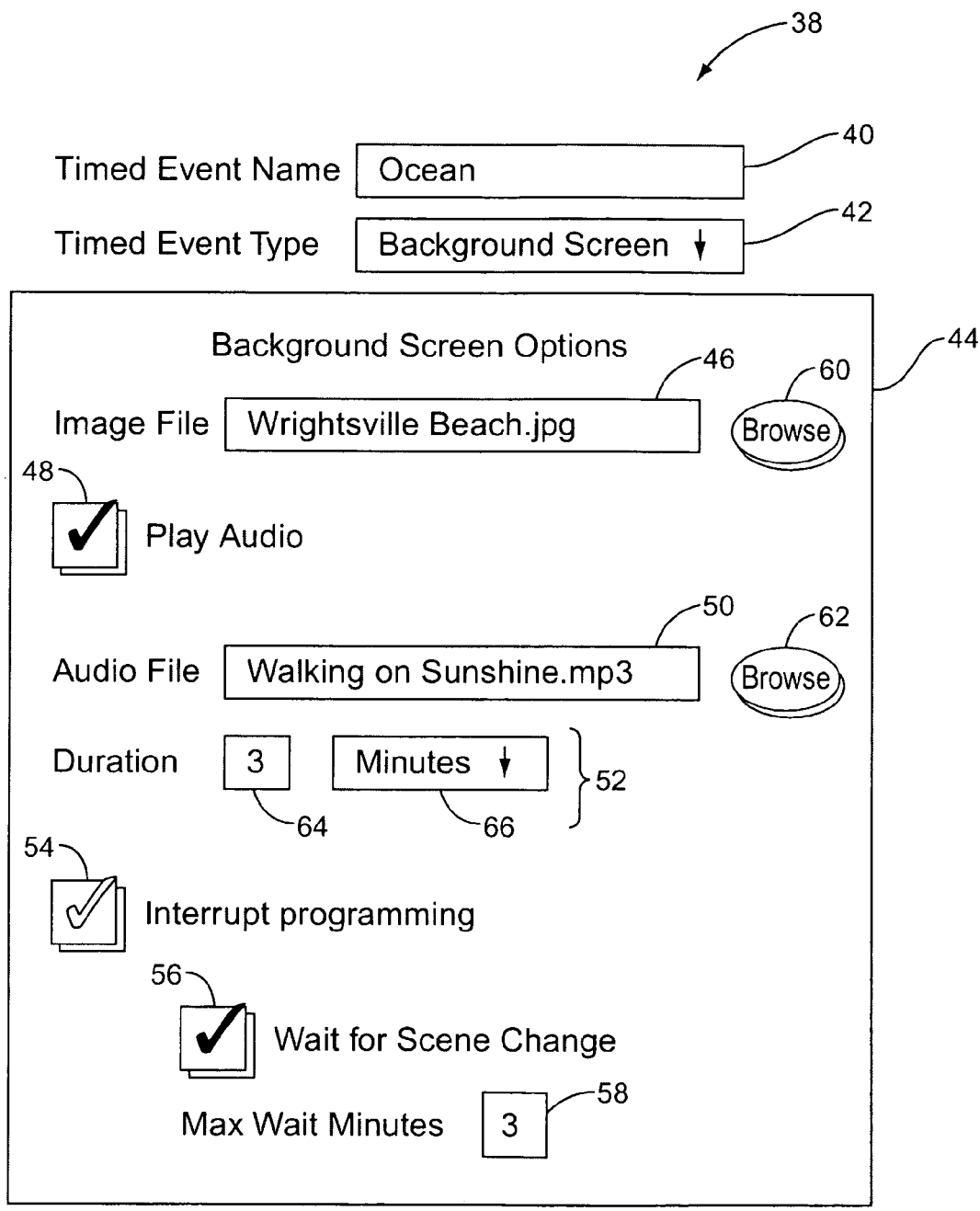
FIG. 2 illustrates an exemplary user interface for configuring a timed event according to one embodiment of the present invention.

According to the present invention, a user may interact with the timed event application 20 either, for example, through the IDPG 34 of the set-top box function 22 or directly through one or more keys on the remote control unit 26 to configure one or more timed events. An exemplary graphical user interface 38 enabling a user to interact with the timed event application 20 to configure, or create a profile for, a timed event is illustrated in FIG. 2. The graphical user interface 38 may include a timed event name field 40, a timed event type field 42, and a number of option fields 44. The timed event name field 40 may be desired to identify a particular timed event when numerous timed events are created. The timed event type field 42 enables the user to select one of a number of pre-defined or user defined timed event types. As discussed above, the timed event types may include, but are not limited to, a background timed event type, an audio timed event type, a visual timed event type, an audio-visual timed event type, or a channel change timed event type. The option fields 44 may vary depending on the timed event type selected in the timed event type field 42.

In this example, the background timed event type is selected. As such, the option fields 44 are option fields defined for the background timed event type. As illustrated, the option fields 44 include an image file field 46, an audio enabling checkbox 48, an audio file field 50, a duration field 52, an interrupt programming checkbox 54, a wait for scene change checkbox 56, and a maximum wait period field 58. The image file field 46 enables a user to identify a desired image to be used as a background image for the timed event, wherein the image is the visual component of the timed event. The user may enter the file name of the desired image or activate an associated browse button 60 to browse through a number of image files to select the desired background image. In this example, the selected background image is "Wrightsville Beach.jpg."

It should be noted that a number of image files that may be selected as the background image may be pre-loaded onto the user equipment 12 in association with the timed event application 20. Alternatively or in addition, the user equipment 12 may have a connection to a network such as the Internet, and the user may interact with the user equipment 12 to download a number of images from the network. Still further, the user may download images to the user equipment 12 for use by the timed event application 20 from a Digital Video Disc (DVD), Compact Disc (CD), memory card, or the like. Optionally, the user equipment 12 may include a memory card slot, and the user may insert a memory card having a number of images stored thereon into the memory slot. The images stored on the memory card may then be used by the timed event application 20.

The audio enabling checkbox 48 enables the user to select whether the timed event is also to include audio content to be played to the user while the background image is displayed. In this example, the audio enabling checkbox 48 is selected. As a result, the graphical user interface 38 enables the user to select an audio file via the audio file field 50. The user may enter the file name of the desired audio file in the audio file field 50 or activate an associated browse button 62 to browse through a number of audio files to select the desired audio file. The audio file may be a song, a sound clip such as bells ringing or a buzzer, the sound of the ocean, or the like. In this example, the user has selected the audio file "Walking on Sunshine.mp3."

As with the images, a number of audio files that may be used by the timed event application 20 may be pre-loaded onto the user equipment 12 in association with the timed event application 20. Alternatively or in addition, the user equipment 12 may have a connection to a network such as the Internet, and the user may interact with the user equipment 12 to download a number of audio files from the network. Still further, the user may download audio files to the user equipment 12 for use by the timed event application 20 from a Digital Video Disc (DVD), Compact Disc (CD), memory card, or the like. Optionally, the user equipment 12 may include a memory card slot, and the user may insert a memory card having a number of audio files stored thereon into the memory slot. The audio files stored on the memory card may then be used by the timed event application 20.

The duration field 52 includes a duration entry field 64 and a time unit selection field 66. The duration entry field 64 and the time unit selection field 66 enable the user to enter a number of minutes or seconds defining the desired duration of the timed event. In this example, the selected duration is three minutes. As such, the timed event will last three minutes when presented to the user. Note that if the audio file is less than three minutes long, the timed event application 20 will loop the audio file such that it plays for three minutes. Likewise, if the audio file is longer than three minutes, the timed event application 20 plays only a three minute segment of the audio file, which, for example, may be the first or last three minutes of the audio file.

The interrupt programming checkbox 54 enables the user to select whether the recorded media, or programming, is to be interrupted by the timed event. If the interrupt programming checkbox 54 is selected, the timed event will interrupt the program. In other words, the programming will be paused while the timed event is presented to the user via the television or display 18. If the interrupt programming checkbox 54 is not selected, the timed event will be presented to the user concurrently with playback of the recorded media content. In this example, the user has selected the interrupt programming checkbox 54. As such, when the timed event is activated, the recorded media will be paused while the background image is displayed on the television or display 18 and the audio file is played. After the duration of the timed event has expired, the playback of the recorded media content will be resumed.

The wait for scene change checkbox 56 enables a user to select whether the timed event application 20 is to wait for a scene change before interrupting the recorded media content to present the timed event to the user. If the wait for scene change checkbox 56 is not selected, the timed event is presented to the user as soon as it is initiated. If the wait for scene change checkbox 56 is selected, once the timed event is initiated, the timed event application 20 waits for a scene change. When a scene change is detected, the timed event application 20 interrupts the recorded media content to present the timed event. As will be apparent to one of ordinary skill in the art, there are numerous methods for detecting a scene change. For example, a scene change may be detected using metadata describing the recorded media content that identifies times at which scene changes occur. As another example, a scene change may be detected by detecting when a substantially black screen is displayed on the television or display 18. The maximum wait period field 58 enables a user to define a maximum amount of time to wait for a scene change. If a scene change is not detected within the defined amount of time, the timed event is presented to the user. Thus, the timed event is presented to the user at either the time at which a scene change is detected or the wait period has elapsed, whichever occurs first.

While the graphical user interface 38 illustrates the configuration of a timed event of the background timed event type, the graphical user interface 38 may similarly be used to configure timed events of other timed event types. If the selected timed event type is the audio timed event type, the option fields 44 may include the audio file field 50 and associated browse button 62 to select the desired audio file, the duration field 52 to select the desired duration of the timed event, the interrupt programming checkbox 54, the wait for scene change checkbox 56, and the maximum wait period field 58.

If the selected timed event type is the visual timed event type, the option fields 44 may include the image file field 46 and associated browse button 60 for identifying the desired image or graphic for the timed event, the duration field 52 for defining the duration of the timed event, the interrupt programming checkbox 54, the wait for scene change checkbox 56, and the maximum wait period field 58. In addition, whether the recorded media content is interrupted or not, the option fields 44 may further include one or more fields defining whether the visual timed event is to overlay the recorded media content or is to be displayed on one portion of the television or display 18 while the recorded media content is to be displayed on another portion of the television or display 18. Further, one or more fields may be provided to enable the user to define the location of the visual timed event on the screen of the television or display 18. For example, the user may desire that the visual timed event cover a certain portion of the screen of the television or display 18. More specifically, the user may configure the visual timed event such that it appears, for example, in the top right-hand corner of the screen.

If the selected timed event is an audio-visual timed event, the option fields 44 may include a video file field enabling the user to select a desired video file, the duration field 52 to select the desired duration of the timed event, the interrupt programming checkbox 54, the wait for scene change checkbox 56, and the maximum wait period field 58.

If the selected timed event type is the channel change timed event type, the option fields 44 may include a channel field defining the desired channel to which to tune for the timed event, the duration field 52 defining the duration of the timed event, the wait for scene change checkbox 56, and the maximum wait period field 58. As an example, the timed event may be configured such that the timed event application 20 pauses the recorded media content when a scene change is detected and instructs the set-top box function 22 to tune to ESPN for a duration of 3 minutes. At the end of the timed event, which is when the 3 minute duration has expired, the timed event application 20 instructs the set-top box function 22 to resume playback of the recorded media.

It should be noted that for all timed event types, the current time of day may optionally be presented to the user either visually or audibly in addition to the other audio, visual, or audio-visual content. If the current time of day is visually presented to the user, the current time may be presented as an overlay over the recorded media content. Alternatively, the current time of day may be presented to the user in a first portion of the screen of the television or display 18 while the recorded media content, or the interrupted recorded media content, is displayed to the user in a second portion of the screen of the television or display 18. Still further, there may be a separate clock timed event type, wherein the timed event presents the current time to the user as audio, visual, or audio-visual content.

Figure 3:
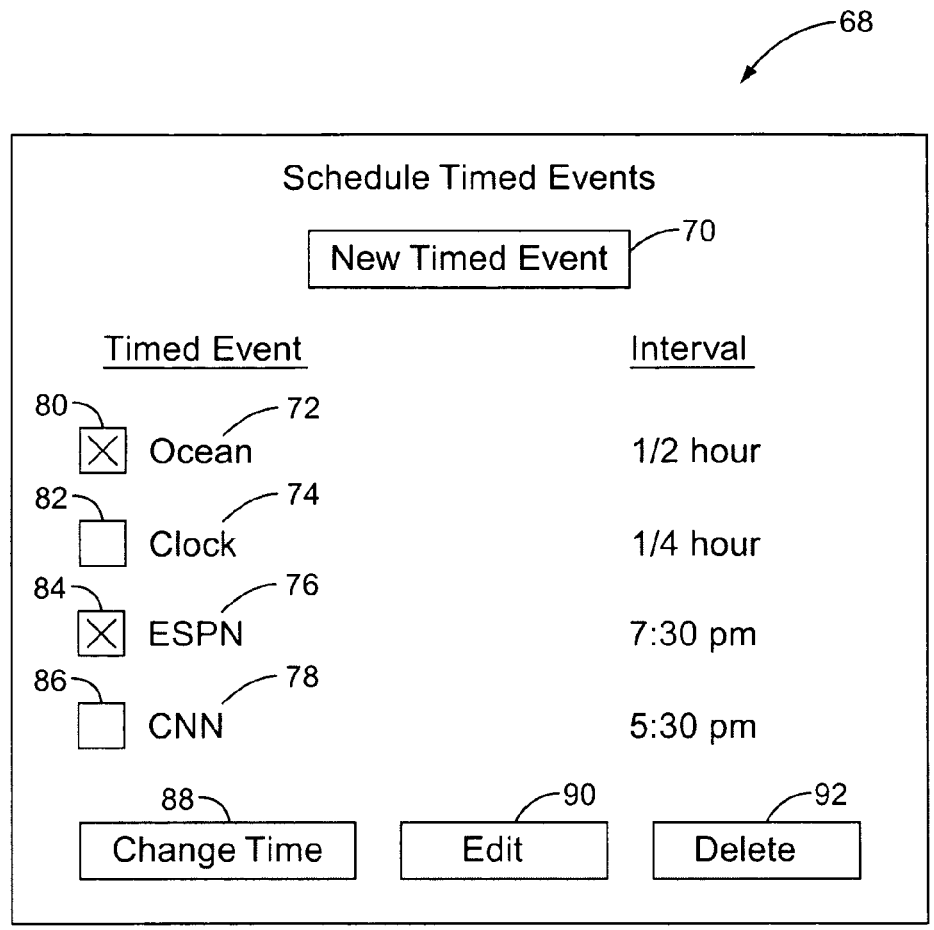
FIG. 3 illustrates an exemplary user interface for managing a number of timed events according to one embodiment of the present invention.

FIG. 3 illustrates an exemplary graphical user interface 68 enabling a user to create and manage one or more timed events according to the present invention. The graphical user interface 68 includes a new timed event button 70. When the new timed event button 70 is activated, the timed event application 20 presents the graphical user interface 38 of FIG. 2 to the user, which enables the user to create, or configure, the new timed event. The graphical user interface 68 also displays the names and time intervals for a number of timed events 72-78. The user may enable or disable the timed events 72-78 by selecting or unselecting associated checkboxes 80-86. In this example, the "Ocean" timed event 72 and the "ESPN" timed event 76 are enabled and the "Clock" timed event 74 and the "CNN" timed event 78 are disabled.

The time intervals of the timed events 72-78 define time intervals at which the timed events 72-78 will occur. Thus, the "Ocean" timed event 72 will occur every half-hour, the "Clock" timed event 74 would occur every quarter-hour if enabled, the "ESPN" timed event 76 will occur once daily at 7:30 pm, and the "CNN" timed event 78 would occur once daily at 5:30 pm if enabled. The time intervals of the timed events 72-78 may be changed via a button 88. When the button 88 is activated, a graphical user interface, such as that illustrated in FIG. 4 and discussed below, may be presented to the user to enable the user to change the time intervals. An edit button 90 enables the user to select a desired one of the timed events 72-78 and change the configurations of the selected timed event using, for example, the graphical user interface 38 of FIG. 2. A delete button 92 enables the user to delete a selected one of the timed events 72-78.

Figure 4:
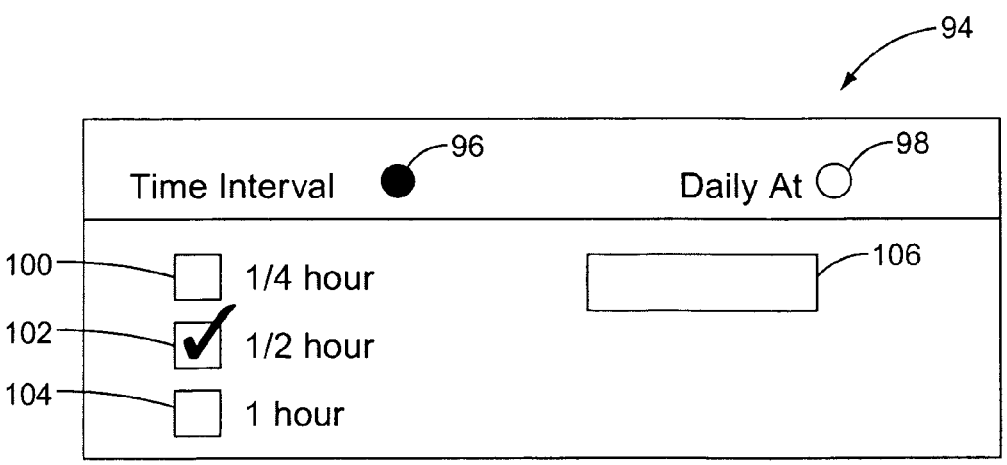
FIG. 4 illustrates an exemplary user interface for changing the time interval of a timed event according to one embodiment of the present invention.

FIG. 4 illustrates an exemplary graphical user interface 94 enabling a user to change the time interval of a selected timed event. The graphical user interface 94 may be activated when, for example, the user activates the button 88 of FIG. 3. It should be noted that the time intervals of the timed events may alternatively be defined along with the other timed event configurations in the graphical user interface 38 of FIG. 2. The graphical user interface 94 includes radio buttons 96 and 98 enabling a user to select whether the time interval is to be less than daily or daily. If the time interval is to be less than daily, the user may select one of a number of checkboxes 100-104 corresponding to a desired time interval. In this example, checkboxes 100-104 are illustrated for a quarter-hour time interval, a half-hour time interval, or an hour time interval. However, the present invention is not limited thereto. The time interval may be any desired time interval. Thus, in an alternative embodiment, a field may be provided enabling the user to enter the desired time interval as a desired number of hours, a desired number of minutes, a desired number of seconds, or any combination thereof. If the time interval is to be daily, the user enters a desired time at which the timed event is to daily occur in field 106.

Figure 5:
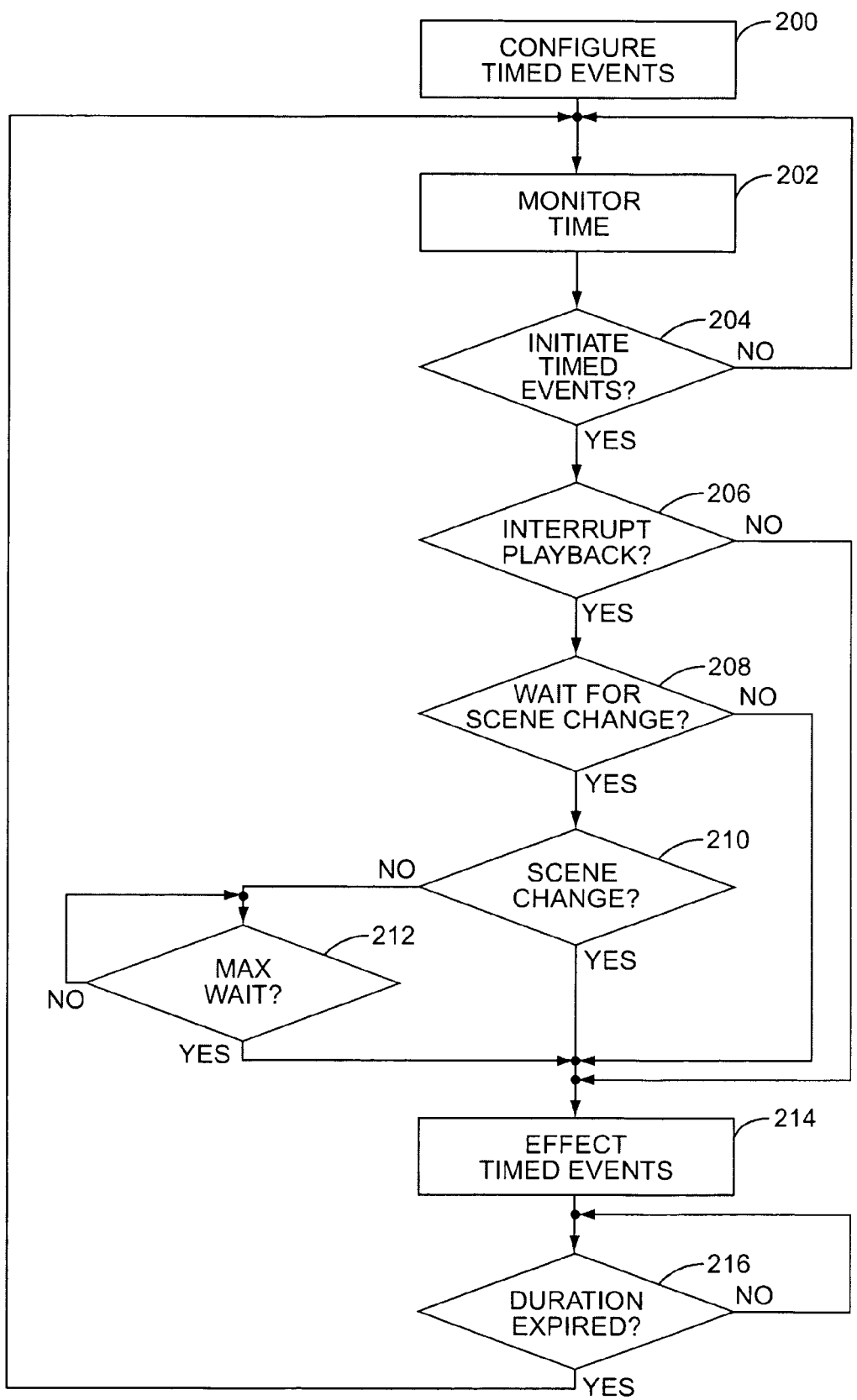
FIG. 5 is a flow chart illustrating the operation of the timed event application of FIG. 1 according to one embodiment of the present invention.

FIG. 5 is a flow chart illustrating the operation of the timed event application 20 according to one embodiment of the present invention. This discussion focuses on a single timed event, but the process is equally applicable to multiple timed events. First, a timed event is configured, as described above (step 200). Next, the timed event application 20, and specifically the timed event initiator 30, monitors the current time of day (step 202). The current time of day may be obtained from an internal clock of the timed event application 20 or a clock associated with the set-top box function 22. Based on the current time of day, the timed event initiator 30 determines whether it is time to initiate the timed event (step 204). For example, if the timed event has a time interval of every half-hour and the current time of day is 1:30 pm, then the timed event initiator 30 determines that it is time for the timed event to be initiated. If it is not time to initiate the timed event, the process returns to step 202. If it is time to initiate the timed event, the timed event initiator 30 instructs the timed event player 32 to effect, or present, the timed event to the user.

At this point, the timed event player 32 determines whether the timed event is configured to interrupt playback of the recorded media content (step 206). If the timed event is not to interrupt playback, the timed event is presented to the user concurrently with the media content (step 214). If the timed event is configured to interrupt playback, the timed event player 32 determines whether the timed event is configured to wait for a scene change (step 208). If the timed event is configured not to wait for a scene change, the timed event player 32 instructs the set-top box function 22 to pause playback of the media content, and the timed event is presented to the user (step 214). If the timed event is configured to wait for a scene change, the timed event player 32 then operates to detect a scene change (step 210). If a scene change is detected, the timed event player 32 instructs the set-top box function 22 to pause playback of the media content during the scene change, and the timed event is presented to the user (step 214). The timed event player 32 may detect a scene change using metadata describing the recorded media content and identifying times at which scene changes occur or by determining when a substantially black screen is presented to the television or display 18. If a scene change is not detected, the timed event player 32 determines whether the maximum waiting period has been exceeded (step 212). If the maximum waiting period has not been exceeded, the timed event player 32 continues to wait for a scene change. If the maximum waiting period has been exceeded, the timed event player 32 pauses playback of the recorded media content, and the timed event is presented to the user (step 214).

In one embodiment, the timed event player 32 presents the timed event to the user by modifying an output of the set-top box function 22 provided to the television or display 18. Depending on whether the recorded media content is to be interrupted or not interrupted, the output of the set-top box function 22 may be modified differently. If the timed event is to be an overlay presented currently with the recorded media content, for example, the output of the set-top box function 22 may be modified by the timed event application 20 to include the visual component of the timed event as an overlay. If the timed event is to interrupt the recorded media content, the output of the set-top box function 22 may be modified to replace the paused frame of the recorded media content with the visual component of the timed event. Numerous other variations will be apparent to one of ordinary skill in the art upon reading this disclosure.

Once the timed event is presented to the user, the timed event player 32 determines when the duration of the timed event has expired (step 216). When the duration of the timed event has expired, the timed event is no longer presented and, if interrupted, playback of the recorded media content is resumed. Alternatively, the user may prematurely end the timed event before the duration has expired by, for example, pressing a select button on the remote control unit 26. At this point, steps 202-216 are repeated to continually present the timed event to the user at the defined time interval.

Figure 6:
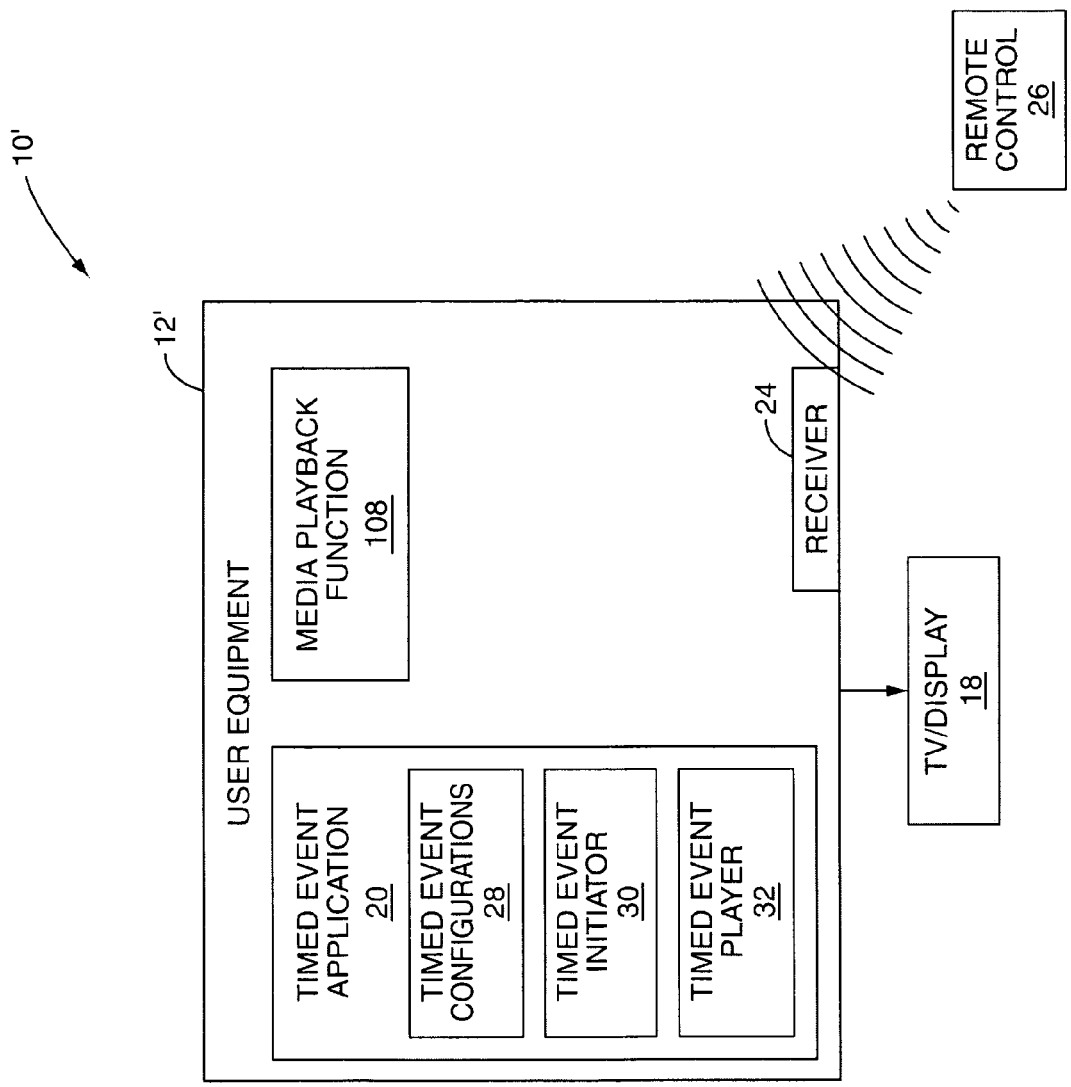
FIG. 6 illustrates the system for providing timed events during playback of recorded media content according to another embodiment of the present invention.

FIG. 6 illustrates the system 10' according to a second embodiment of the present invention. In this embodiment, the user equipment 12' is a media player such as a DVD player or the like including the timed event application 20 and a media playback function 108. The media playback function 108 may be hardware, software, or a combination of hardware and software enabling playback of media content such as a DVD. In general, the timed event application 20 operates enable a user to configure timed events and to present the timed events to the user during playback of media content. Since the details of operation are as described above, they are not repeated for conciseness.

Figure 7:
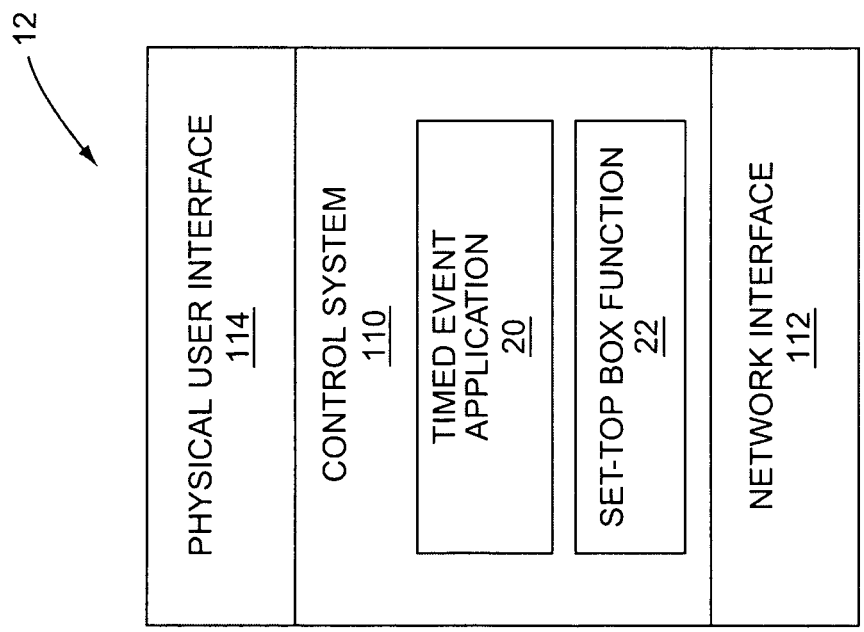
FIG. 7 is a block diagram of the user equipment of FIG. 1 according to one embodiment of the present invention.

FIG. 7 is a block diagram of the user equipment 12 of FIG. 1. In general, the user equipment 12 includes a control system 110 including the timed event application 20 and the set-top box function 22. In addition, the user equipment 12 includes a network interface 112 coupling the user equipment 12 to the network 16 (FIG. 1). The user equipment 12 also includes a physical user interface 114 including, for example, the receiver 24.

Figure 8:
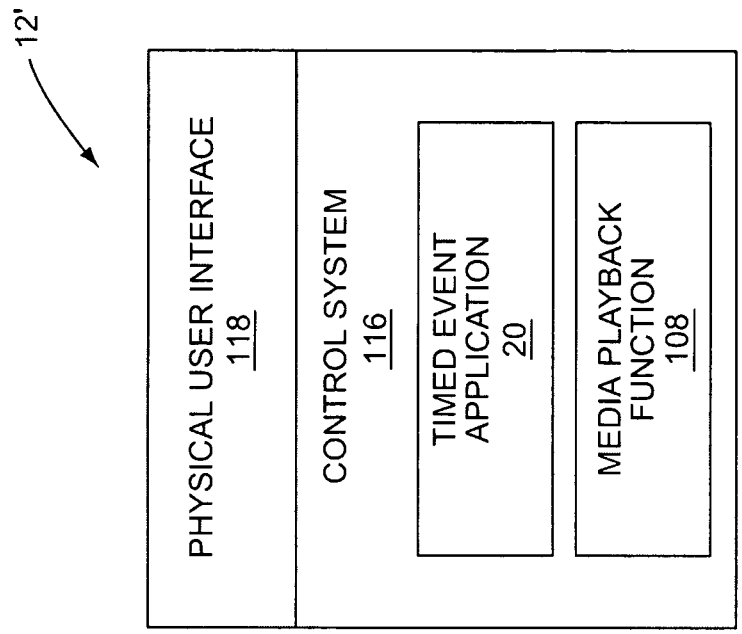
FIG. 8 is a block diagram of the user equipment of FIG. 6 according to one embodiment of the present invention.

FIG. 8 is a block diagram of the user equipment 12' of FIG. 6. In general, the user equipment 12' includes a control system 116 including the timed event application 20 and the media playback function 108. In addition, the user equipment 12' includes a physical user interface 118 including, for example, the receiver 24.

Those skilled in the art will recognize improvements and modifications to the preferred embodiments of the present invention. All such improvements and modifications are considered within the scope of the concepts disclosed herein and the claims that follow.

What is claimed is:

1. An end-user device for providing timed events during playback of recorded media content comprising:
   a processor;
   a control system associated with the processor and configured to:
      record the media content;
      define a timed event, a time interval for the timed event, and a duration for the timed event;
      periodically interrupt playback of the recorded media content;
      effect the timed event at the time interval for the duration of the timed event while playback of the recorded media content is interrupted, wherein the end-user device periodically effects the timed event during playback; and
      resume playback of the recorded media content.

2. The end-user device of claim 1 wherein effecting the timed event provides an indication of time to a viewer of the recorded media content.

3. The end-user device of claim 1 wherein defining the timed event further comprises defining a duration for the timed event, and the processor is further configured to:
   initiate the timed event based on the time interval;
   detect a scene change in the recorded media content;
   interrupt playback of the recorded media content when the scene change is detected;
   effect the timed event for the duration of the timed event while playback is interrupted; and
   resume playback of the recorded media content.

4. The end-user device of claim 3 wherein detecting the scene change comprises detecting the scene change based on metadata associated with the recorded media content, wherein the metadata comprises information identifying a plurality of scene changes in the recorded media content including the scene change.

5. The end-user device of claim 3 wherein detecting the scene change comprises detecting a point during playback of the recorded media content when a substantially black screen is presented to a user.

6. The end-user device of claim 3 wherein the processor is further configured to interrupt playback of the recorded media content when a maximum waiting period after initiating the timed event has expired and effecting the timed event for the duration of the timed event if no scene change is detected during the maximum waiting period.

7. The end-user device of claim 1 wherein effecting the timed event comprises periodically effecting the timed event concurrently with playback of the recorded media content.

8. The end-user device of claim 1 wherein the processor is further configured to effect the timed event comprises periodically effecting the timed event for the duration of the timed event.

9. The end-user device of claim 1 further comprising:
define a plurality of timed events including the timed event, each of the plurality of timed events having a time interval; and
effect the plurality of timed events according to the time interval of each of the plurality of timed events during playback of the recorded media content.

10. The end-user device of claim 1 wherein defining the timed event further comprises defining an event type for the timed event.

11. The end-user device of claim 10 wherein defining the event type for the timed event comprises defining the event type as an audio event type such that the timed event comprises audio content, and periodically effecting the timed event comprises periodically effecting presentation of the audio content.

12. The end-user device of claim 10 wherein defining the event type for the timed event comprises defining the event type as a visual event type such that the timed event comprises visual content, and periodically effecting the timed event comprises periodically effecting presentation of the visual content.

13. The end-user device of claim 10 wherein defining the event type for the timed event comprises defining the event type as an audio-visual event type such that the timed event comprises audio-visual content, and periodically effecting the timed event comprises periodically effecting presentation of the audio-visual content.

14. The end-user device of claim 10 wherein defining the event type for the timed event comprises defining the event type as a channel change event type having an associated television channel, and periodically effecting the timed event comprises periodically effecting presentation of the associated television channel rather than the recorded media content.

15. The end-user device of claim 1 wherein the timed event comprises a visual component, and periodically effecting the timed event comprises periodically effecting presentation of the visual component as an overlay positioned over at least a portion of the recorded media content.

16. The end-user device of claim 1 wherein the timed event comprises a visual component, and periodically effecting the timed event comprises periodically effecting presentation of the recorded media content on a first portion of an associated display and presentation of the visual component on a second portion of the associated display.

17. The end-user device of claim 1, wherein the end-user device is a set-top box.

\* \* \* \* \*